March 27, 1956 W. H. RASER, JR 2,739,656
RESILIENT VARIABLE PITCH ROTOR BLADE MOUNT
Filed June 25, 1952

INVENTOR.
BY William H. Raser, Jr.

United States Patent Office 2,739,656
Patented Mar. 27, 1956

2,739,656

RESILIENT VARIABLE PITCH ROTOR BLADE MOUNT

William Heyl Raser, Jr., Stratford, Conn.

Application June 25, 1952, Serial No. 295,434

2 Claims. (Cl. 170—160.53)

The invention relates to improvements in helicopters, airplanes, fans, windmills, and other machines employing airscrews in which the blades of the airscrews change pitch whenever necessary in order to maintain a more nearly constant rotational speed than would be obtained if the pitch angles of these blades remained fixed during their rotation; and the objects of the improvement are, first, to eliminate the need for articulation and bearings or sliding friction between parts of speed-governing retainer springs; and second, to increase the useful range of the operating positions of the blade angles or blade pitch for a given blade and given number of struts.

One form of the invention is illustrated in the accompanying drawings, and

Figure 1:
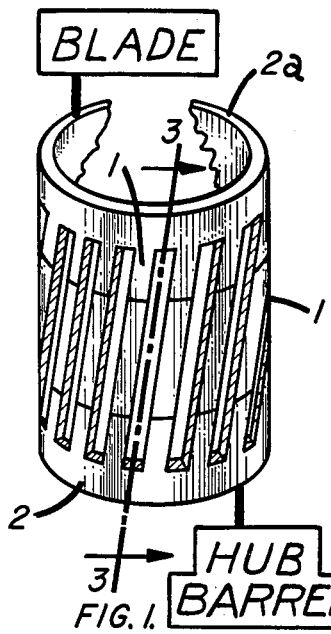
Figure 1 is an isometric projection of the rotor blade mount of the instant invention and showing in schematic form the mount as interposed between a rotor blade and a rotor blade hub barrel.

The active elements of this spring are the slender columns or struts 1 1 which have their length oriented nearly parallel to the axis of the spring or a vertical axis in Figure 1 and which are arranged with equal spacing to form a cylinder. Because they are inclined instead of being parallel, they represent chords of helices that form a cylinder rather than actual elements of this cylinder, but this inclination is small. A ring 2 forms one end of this cylindrical array of struts, and a second ring 2a forms the other end, these rings being fixed by some means, such as by welding to the struts or made integral with the struts at the ends.

A cross section of a strut at any point along the length of the strut is a rectangle for the form of the invention which is illustrated. However, the strut is not uniform throughout its entire length but only throughout sections of its length; that is, the dimensions of the above rectangle describing the cross section make two abrupt changes from one end to the other. The struts are symmetrical about the center and, hence, the end sections are identical. The transition in cross section occurs at a distance in from each end equal to one fourth of the strut length. If separation was made where transition occurs, there would exist two identical rectangular solids 3 3 or end lengths and one rectangular solid 4 or center length for each strut, neglecting the effect of strut inclination. In other words, the complete retainer spring for airscrew blades is composed of two rings, a number of center lengths, and twice that number of end lengths all rigidly connected to form a single solid.

Figure 2:
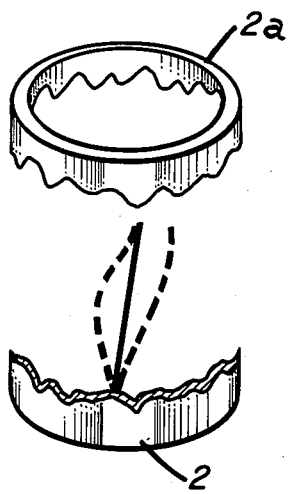
Figure 2 is an isometric projection of the mount with a portion of the elements cut away and indicating by dotted lines the first and second modes of buckling as deflection occurs.
Figure 5:
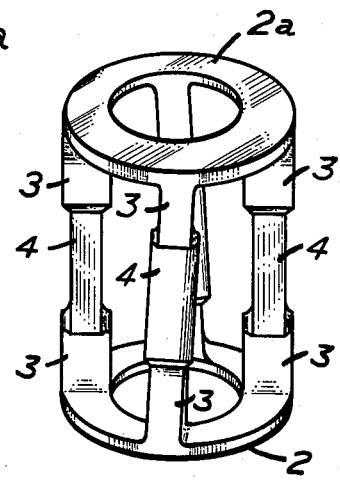
Figure 5 is an isometric projection of a simplified and slightly modified form of mount and having the dimensions of the various elements somewhat exaggerated for the purpose of more clearly showing the critical features of the invention.
Figure 3:
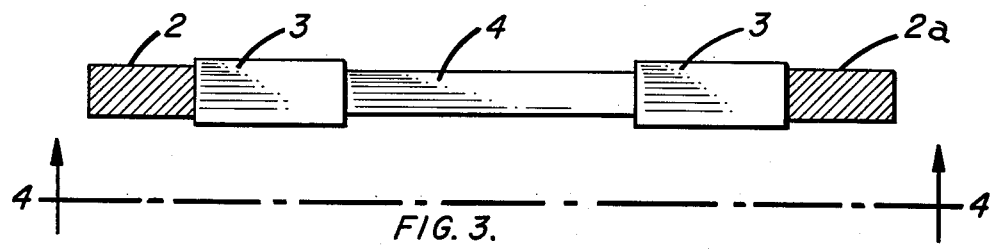
Figure 3 is an expanded view of one of the spring elements taken as a sectional view in the direction of lines 3—3 of Figure 1.
Figure 4:
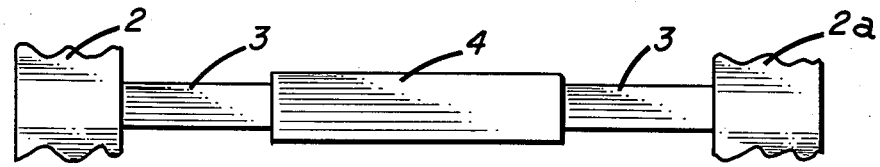
Figure 4 is a view of the element shown in Figure 3 taken in the direction of lines 4—4 of Figure 3.

If one ring 2 of this spring is fixed in space and the other ring 2a is subjected to a force along the axis of the spring (the axis of the above cylinder) tending to compress the length of the spring, the struts, being slender columns, will tend to buckle. This buckling will take the form of what is known as fixed-fixed buckling, of which the first two modes are the deflections shown by broken lines in Figure 2. The first mode, the one caused by the smallest critical value of the compressive force, is the one which causes a desirable deflection of one end or the top end of the struts. The axis of an undeflected strut is shown as a solid line in this figure and represents approximately the position of the strut, when the compressive load is less than the first critical value. If the axis of the deflected strut described above were drawn through the ends of the strut, the increase in the inclination or the decrease in the helix angle so represented would indicate that the upper ring has been rotated. Thus the upper ring serves as a rotatable platform for turning whatever is attached to it to some angular position which is a function of a vertical compressive force. If rotation of this ring is prevented and the compressive load is further increased until the second critical value is reached, the one corresponding to the second mode of buckling, the spring could, of course, be destroyed. Usually, it is possible to limit the useful range of applied force to small values on either side of the first critical value. In other words, within a range of applied force, the spring is non-linear: when a critical value of force is reached, small further increases in force cause large angular deflections.

A typical application of this spring is in an automatic constant-speed airplane propeller. The hub of any variable-pitch propeller retains each blade centripetally against the action of centrifugal force. The means for retaining the blade are housed in a tube called a hub barrel into which the shank of the blade is inserted. If the above-described mount is used it is interposed between the blade and the hub and specifically may be inserted between the outside diameter of the blade shank and the inside diameter of the hub barrel, as is shown in Letters Patent 1,907,504 issued to R. Chilton on May 9, 1933. One of the two rings 2 or 2a of the spring is fixed to the barrel and the other is fixed to the blade. The centrifugal force of the blade provides the axial load on the spring and the twisting of the spring provides the change of pitch of the blade. These elements are so arranged that the critical load on the spring corresponds to the desired centrifugal force of the blade and the blade will increase pitch or decrease pitch when the centrifugal force is too high or too low, respectively.

Since the second mode of buckling must always be avoided in this or any similar application, anything that retards or opposes blade motion when the first critical load is applied is undesirable. One source of this undesirable retardation is the torsional stiffness of the struts, a quantity that is maximum when the strut cross sections become squares. Hence, rectangular cross sections are used throughout and their orientation is such as to encourage the first mode of buckling and to discourage the second; that is, the longer dimension of the rectangle is oriented in a radial direction to the spring in the end lengths 3 3 and in a tangential direction in the center length 4.

I am aware that prior to my invention non-linear springs have been used for automatic speed control of airscrews. I therefore do not claim such a combination broadly; but

I claim:

1. A variable pitch rotor blade mounting comprising a rotor blade, a rotor blade hub barrel and a rotor blade mount, said mount being interposed between said blade and said barrel, said mount comprising a first ring element secured to said blade, a second ring element secured to said hub, said ring elements being substantially in axial alignment, and a plurality of elongated, resilient strut elements extending between said ring elements and having their ends integrally connected to said ring elements, each of said strut elements having a central portion and end portions, said central portions measured radially of said ring elements being of a lesser dimension than said end portions, thereby providing greater flexibility in said end portions, said flexibility providing a blade pitch change.

2. A variable pitch rotor blade mounting comprising a rotor blade, a rotor blade hub barrel and a rotor blade mount, said mount being interposed between said blade and said hub barrel, said mount comprising a first ring element secured to said blade, a second ring element secured to said hub, said ring elements being substantially in axial alignment, and a plurality of elongated resilient strut elements extending between said ring elements and having their ends integrally connected to said ring elements, each of said strut elements having a central portion and end portions, said central portions measured radially of said ring elements being of a lesser dimension than said end portions, and, conversely, said central portions measured at right angles to said first direction of measurement being larger than said end portions, thereby providing greater flexibility in said end portions, said flexibility providing a blade pitch change.

References Cited in the file of this patent

UNITED STATES PATENTS

| 2,515,607 | Miller | July 18, 1950 |

FOREIGN PATENTS

| 385,074 | Great Britain | Dec. 22, 1932 |
| 545,152 | France | July 13, 1922 |